(12) United States Patent
Chang et al.

(10) Patent No.: US 11,016,308 B1
(45) Date of Patent: May 25, 2021

(54) NANOPARTICLE DOPED LIQUID CRYSTAL DEVICE FOR LASER SPECKLE REDUCTION

(71) Applicants: GM GLOBAL TECHNOLOGY OPERATIONS LLC, Detroit, MI (US); KENT STATE UNIVERSITY, Kent, OH (US)

(72) Inventors: Kai-Han Chang, Madison Heights, MI (US); John Harden, Streetsboro, OH (US); Liang-Chy Chien, Hudson, OH (US)

(73) Assignees: GM GLOBAL TECHNOLOGY OPERATIONS LLC, Detroit, MI (US); KENT STATE UNIVERSITY, Kent, OH (US)

( * ) Notice: Subject to any disclaimer, the term of this patent is extended or adjusted under 35 U.S.C. 154(b) by 0 days.

(21) Appl. No.: 16/711,271

(22) Filed: Dec. 11, 2019

(51) Int. Cl.
  *G02F 1/133* (2006.01)
  *G02F 1/1333* (2006.01)
  (Continued)

(52) U.S. Cl.
  CPC ......... *G02B 27/48* (2013.01); *G02F 1/13306* (2013.01); *G02F 1/13394* (2013.01);
  (Continued)

(58) Field of Classification Search
  CPC .. G02B 27/0172; G02B 27/48; G02B 27/017; G02B 27/0101; G02B 27/425; G02B 27/01; G02B 2027/0118; G02F 1/133; G02F 1/141; G02F 1/1343; G02F 1/1339; G02F 1/1337; G02F 1/1335;
  (Continued)

(56) References Cited

U.S. PATENT DOCUMENTS

| 10,302,937 B2 | 5/2019 | Ferris et al. |
| 10,747,314 B1 | 8/2020 | Chang et al. |

(Continued)

OTHER PUBLICATIONS

Seder, Thomas A. et al., U.S. Appl. No. 16/459,994, filed Jul. 2, 2019 entitled, "Eye Height Based Virtual Image Alignment for Head-up Display," 36 pages.

(Continued)

*Primary Examiner* — Thoi V Duong
(74) *Attorney, Agent, or Firm* — Harness, Dickey & Pierce, P.L.C.

(57) ABSTRACT

An optical display device includes a coherent light source generating a coherent light beam in visible, ultraviolet, or infrared ranges. The coherent light beam is directed at a liquid crystal component. A plurality of liquid crystals and a plurality of nanoparticles having an average diameter of ≤about 450 nm are disposed in an interior compartment. An electrical source is in electrical communication with the first and the second electrodes. When no voltage or current is applied, a filtered light beam transmitted or reflected from the liquid crystal component exhibits a first speckle contrast ≥about 0.28. When voltage or current is applied, the microparticles are induced to move and the filtered light beam has a second speckle contrast that is ≤about 0.2 and in certain aspects may be ≤about 0.03. A method of reducing speckle in an optical device having a coherent light source is also provided.

18 Claims, 8 Drawing Sheets

(51) Int. Cl.
*G02B 27/48* (2006.01)
*G02F 1/1343* (2006.01)
*G02F 1/1339* (2006.01)
*G02F 1/141* (2006.01)
*G02B 27/01* (2006.01)

(52) U.S. Cl.
CPC .......... *G02F 1/13439* (2013.01); *G02F 1/141* (2013.01); *G02B 27/0101* (2013.01); *G02B 2027/0118* (2013.01); *G02F 1/133362* (2013.01)

(58) Field of Classification Search
CPC ............. G02F 1/13394; G02F 1/13439; G02F 2001/13756; G02F 2001/133738; G02F 2001/133742; G02F 2001/13706; G02F 2001/13712; G02F 2202/36; B82Y 20/00; B82Y 30/00; C09K 19/02
See application file for complete search history.

(56) References Cited

U.S. PATENT DOCUMENTS

| | | | | |
|---|---|---|---|---|
| 2012/0147279 | A1* | 6/2012 | Koyanagi | G02B 26/06 349/5 |
| 2016/0109701 | A1 | 4/2016 | Goldman-Shenhar et al. | |
| 2017/0161949 | A1 | 6/2017 | Seder et al. | |
| 2017/0161950 | A1 | 6/2017 | Seder et al. | |
| 2019/0196216 | A1* | 6/2019 | Hansford | G02F 1/133382 |
| 2020/0032665 | A1 | 1/2020 | Propheter-Hinckley | |
| 2020/0073138 | A1 | 3/2020 | Chang | |
| 2020/0073139 | A1 | 3/2020 | Chang | |
| 2020/0310113 | A1 | 10/2020 | Chang et al. | |

OTHER PUBLICATIONS

Harden, John et al., U.S. Appl. No. 16/676,213, filed Nov. 6, 2019 entitled, "Controlled Particle Motion for Laser Speckle Reduction," 48 pages.

Chang, Kai-Han et al., "Laser Speckle Reduction using Nanoparticle-Embedded Liquid Crystals," SID Symposium Digest of Technical Papers 48(1), pp. 804-807 (Published May 2017) ; DOI: 10.1002/sdtp.11758.

Guo, Qi et al., "Ferroelectric Liquid Crystals: Physics and Applications," Crystals, 9, 470 (Published Sep. 9, 2019); DOI: 10.3390/cryst9090470.

Ishiwaka, Hayato et al., "Reduction of laser speckle noise by using particle-dispersed liquid crystals," Molecular Crystals and Liquid Crystals, 646:1, pp. 93-98; DOI: 10.1080/15421406.2017.1284540.

Kobayashi, Shunsuke et al., "Further study of optical homogeneous effects in nanoparticle embedded liquid-crystal devices," Journal of Molecular Liquids, 267 (2018), pp. 303-307 (Published online Jan. 16, 2018); DOI: 10.1016/j.molliq.2018.01.067.

Kobayashi, Shunsuke et al., "Optical homogenizing effects in nanoparticle-embedded liquid crystal devices," Proc. SPIE 10125, Emerging Liquid Crystal Technologies XII, San Francisco, California, 1012511 (Feb. 27, 2017) DOI: 10.1117/12.2260918.

Pirkl, Slavomir et al., "Ferroelectric Liquid Crystals with High Spontaneous Polarization," Ferroelectrics—Physical Effects, ISBN: 978-953-307-453-5 (Published Aug. 2011).

Pandey, M.B. et al., "Anti-Ferroelectric Liquid Crystals: Smart Materials for Future Displays," Advanced Energy Materials, pp. 389-432 (Published Jan. 2014); DOI: 10.1002/9781118904923.ch10.

* cited by examiner

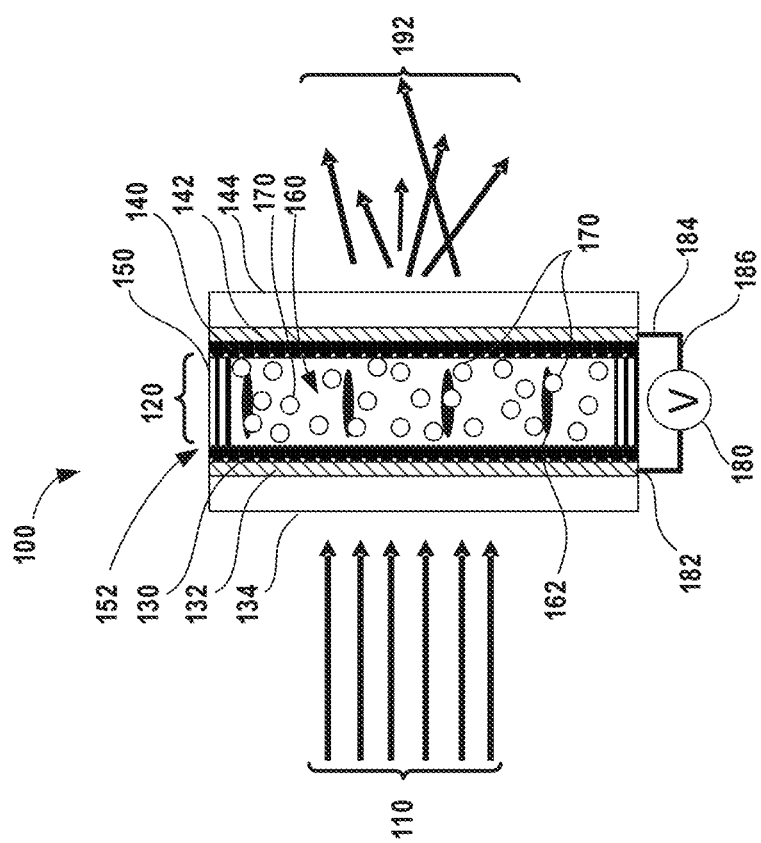
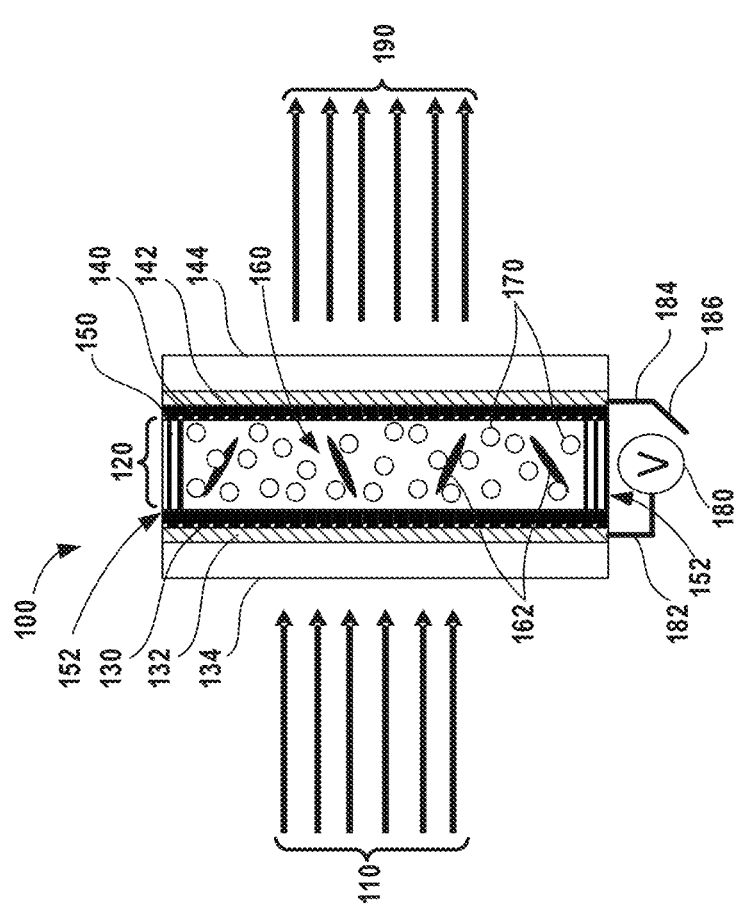

NANOPARTICLE DOPED LIQUID CRYSTAL DEVICE FOR LASER SPECKLE REDUCTION

INTRODUCTION

This section provides background information related to the present disclosure which is not necessarily prior art.

The present disclosure pertains to an optical device, such as a display device, that includes a coherent light source generating a coherent light beam in a visible range, an ultraviolet range, or an infrared range and a liquid crystal component comprising a plurality of liquid crystals and a plurality of nanoparticles. In certain aspects, the optical device reduces speckle contrast of the coherent light beam to less than or equal to about 0.2. Methods of reducing speckle in an optical device having a coherent light source are also provided.

Display devices are used in a variety of applications. The techniques described in this disclosure are generally applicable to a variety of display devices, including any either transmission or reflection type flat panel display, especially three-dimensional projection displays. For example, a vehicle may include one or more displays, such as an infotainment system or a head-up display (HUD) that displays information on a windshield of the vehicle. For example, a HUD may display a vehicle speed and other vehicle information (e.g., warnings like lane departure warnings and collision avoidance warnings). Many display systems include a liquid crystal display (LCD) component.

Various display systems often employ a source of coherent light, such as a laser, in conjunction with the other display components, like LCD components. However, using a laser as an illumination source can potentially create a large amount of speckle that arises from coherence of the laser. When coherent light is reflected from a diffused surface, various points on the surface each emit a light wave. Typically, all of the reflected light waves have the same frequency, but the phase and amplitude of the light reflected from different points on the surface can vary. The light can thus interfere constructively and destructively to produce a pattern of light and dark spots or bands that appear to be random, which are considered to be speckles. When forming an image from the reflected light, the speckle effect can add noise to the image.

SUMMARY

This section provides a general summary of the disclosure, and is not a comprehensive disclosure of its full scope or all of its features.

The present disclosure relates to an optical device. A coherent light source generates a coherent light beam having a wavelength in a visible range, an ultraviolet range, or infrared range. The optical device also includes a liquid crystal component, where the coherent light beam is directed at the liquid crystal component. The liquid crystal component includes a first electrode configured to transmit the coherent light beam, a second electrode configured to transmit or reflect the coherent light beam, and at least one spacer disposed between the first electrode and the second electrode to define an interior compartment therebetween. The liquid crystal component also includes a plurality of liquid crystals and a plurality of nanoparticles disposed in the interior compartment. The plurality of liquid crystals has a first refractive index and selected from the group consisting of ferroelectric liquid crystals and nematic liquid crystals. The plurality of nanoparticles has a second refractive index and an average diameter of less than or equal to about 450 nm. A difference between the first refractive index and the second refractive index is greater than 0 to less than or equal to about 0.5. The optical device also includes an electrical source in electrical communication with the first electrode and the second electrode. In a first state having no applied voltage or current, a filtered light beam that is transmitted or reflected from the liquid crystal component exhibits a first speckle contrast greater than or equal to about 0.28. In a second state when a voltage or current is applied to the first and second electrodes from the electrical source, the plurality of nanoparticles generate a temporal averaging effect and the filtered light beam has a second speckle contrast that is less than or equal to about 0.2.

In one aspect, the average diameter of the plurality of nanoparticles is greater than or equal to about 1 nm to less than or equal to about 100 nm. Further, the plurality of nanoparticles has a shape selected from the group consisting of: spheres, ellipsoids, rectangles, polygons, discoids, ellipsoids, toroids, cones, pyramids, rods, cylinders, crosses, and combinations thereof.

In one aspect, the plurality of liquid crystals includes ferroelectric liquid crystals and the average diameter of the plurality of nanoparticles is greater than or equal to about 1 nm to less than or equal to about 10 nm.

In one aspect, the plurality of liquid crystals includes negative nematic liquid crystals and the average diameter of the plurality of nanoparticles is greater than or equal to about 1 nm to less than or equal to about 100 nm.

In one aspect, the plurality of nanoparticles includes a material selected from the group consisting of: silicon oxide ($SiO_2$), zirconium dioxide ($ZrO_2$), titanium dioxide ($TiO_2$), and combinations thereof.

In one aspect, the plurality of nanoparticles includes a material having a refractive index of greater than or equal to about 0.48 to less than or equal to about 2.

In one aspect, the second speckle contrast is less than or equal to about 0.1 at an applied voltage of greater than or equal to about 30V.

In one aspect, the interior compartment includes greater than 0 weight % to less than or equal to about 10 weight % of the plurality of nanoparticles.

In one further aspect, the interior compartment optionally further includes a polymer at less than or equal to about 30 weight %, a surfactant at less than or equal to about 1 weight %, and a balance the plurality of liquid crystals.

In one aspect, the electrical source is configured to apply a frequency of electrical energy of greater than 0 Hz to less than or equal to about 1 kHz and having a voltage of greater than or equal to about 1V to less than or equal to about 1 kV.

In one aspect, the first electrode and the second electrode are respectively disposed on transparent substrates and the first electrode and the second electrode independently include an electrically conductive material selected from the group consisting of: indium tin oxide, metallic nanowires, metallic particles, gallium zinc oxide, aluminum gallium zinc oxide, poly(3,4-ethylenedioxythiophene) (PEDOT), and combinations thereof.

The present disclosure further relates to a display device including a coherent light source that generates a coherent light beam having a wavelength in a visible range. The display device includes an imaging system that generates a display image from the coherent light beam. The imaging system includes a liquid crystal component including a first electrode configured to transmit the coherent light beam, a second electrode configured to transmit or reflect the coherent light beam, and at least one spacer disposed between the first electrode and the second electrode to define an interior compartment therebetween. A plurality of liquid crystals is disposed in the interior compartment having a first refractive index and selected from the group consisting of ferroelectric liquid crystals and nematic liquid crystals. A plurality of nanoparticles having a second refractive index and an average diameter of less than or equal to about 450 nm disposed in the interior compartment. A difference between the first refractive index and the second refractive index is greater than 0 to less than or equal to about 0.5. The display device further includes an electrical source in electrical communication with the first electrode and the second electrode, wherein in a first state having no applied voltage or current, a filtered light beam that is transmitted or reflected from the liquid crystal component exhibits a first speckle contrast greater than or equal to about 0.28. In a second state when a voltage or current is applied to the first and second electrodes from the electrical source, the plurality of nanoparticles generate a temporal averaging effect and the filtered light beam has a second speckle contrast that is less than or equal to about 0.2.

In one aspect, the imaging system includes an imaging device and the liquid crystal component is disposed in the imaging system:

before the display image is generated by an imaging device;

after the display image is generated by an imaging device, wherein the liquid crystal component is a projection screen for the display image; or after the display image is generated by an imaging device, wherein the imaging system further includes a projection screen and the liquid crystal component is disposed between imaging device and the projection screen.

In one aspect, the electrical source is configured to apply a frequency of electrical energy of greater than 0 Hz to less than or equal to about 1 kHz and having a voltage of greater than or equal to about 1V to less than or equal to about 1 kV.

In one aspect, the interior compartment includes greater than 0 weight % to less than or equal to about 10 weight % of the plurality of nanoparticles, the plurality of nanoparticles includes a material selected from the group consisting of: silicon oxide ($SiO_2$), zirconium dioxide ($ZrO_2$), titanium dioxide ($TiO_2$), and combinations thereof, and combinations thereof, and either:

(i) the plurality of liquid crystals includes ferroelectric liquid crystals and the average diameter of the plurality of nanoparticles is greater than or equal to about 1 nm to less than or equal to about 10 nm; or (ii) the plurality of liquid crystals includes negative nematic liquid crystals and the average diameter of the plurality of nanoparticles is greater than or equal to about 1 nm to less than or equal to about 100 nm.

The present disclosure also further relates to a method of reducing speckle in an optical device having a coherent light source. The method includes directing a coherent light beam generated by the coherent light source having a wavelength in a visible range, an ultraviolet range, or infrared range towards a liquid crystal component including a first electrode configured to transmit the coherent light beam, a second electrode configured to transmit or reflect the coherent light beam, and at least one spacer disposed between the first electrode and the second electrode to define an interior compartment therebetween. The liquid crystal component also includes a plurality of liquid crystals disposed in the interior compartment having a first refractive index and selected from the group consisting of ferroelectric liquid crystals and negative nematic liquid crystals. A plurality of nanoparticles having a second refractive index and an average diameter of less than or equal to about 450 nm is also disposed in the interior compartment. A difference between the first refractive index and the second refractive index is greater than 0 to less than or equal to about 0.5. An electrical source in electrical communication with the first electrode and the second electrode. The method includes applying electrical energy via the electrical source to the first electrode and the second electrode of the liquid crystal component to induce random domains in the plurality of liquid crystals and reduce a speckle contrast of the coherent light beam transmitted or reflected from the liquid crystal component to less than or equal to about 0.2.

In one aspect, the electrical energy has a frequency greater than 0 Hz to less than or equal to about 1 kHz and a voltage of greater than or equal to about 1V to less than or equal to about 1 kV.

In one aspect, the speckle contrast is less than or equal to about 0.1 when the electrical energy is applied at a voltage of greater than or equal to about 30V.

In one aspect, the plurality of liquid crystals includes negative nematic liquid crystals and the applying electrical energy generates a top-down electrical field to induce instability and generate random domains in the plurality of liquid crystals to create a temporal averaging effect.

In one aspect, the plurality of liquid crystals includes ferroelectric liquid crystals and the applying electrical energy includes applying an alternating current (AC), so that the ferroelectric liquid crystals swing on a microsecond scale to create a temporal averaging effect by constructive-destructive interference.

In one aspect, the interior compartment includes greater than 0 weight % to less than or equal to about 10 weight % of the plurality of nanoparticles, the plurality of nanoparticles includes a material selected from the group consisting of: silicon oxide ($SiO_2$), zirconium dioxide ($ZrO_2$), titanium dioxide ($TiO_2$), and combinations thereof and either:

(i) the plurality of liquid crystals includes ferroelectric liquid crystals and the average diameter of the plurality of nanoparticles is greater than or equal to about 1 nm to less than or equal to about 10 nm; or (ii) the plurality of liquid crystals includes negative nematic liquid crystals and the average diameter of the plurality of nanoparticles is greater than or equal to about 1 nm to less than or equal to about 100 nm.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 2A-2B show liquid crystal components prepared in accordance with certain aspects of the present disclosure that include a plurality of nanoparticles for reducing speckle contrast of a coherent light beam. FIG. 2A shows a first operational state with no electrical energy applied, while FIG. 2B shows a second operational state with electrical energy applied to generate an electric field.

Corresponding reference numerals indicate corresponding parts throughout the several views of the drawings.

DETAILED DESCRIPTION

Figure 1:
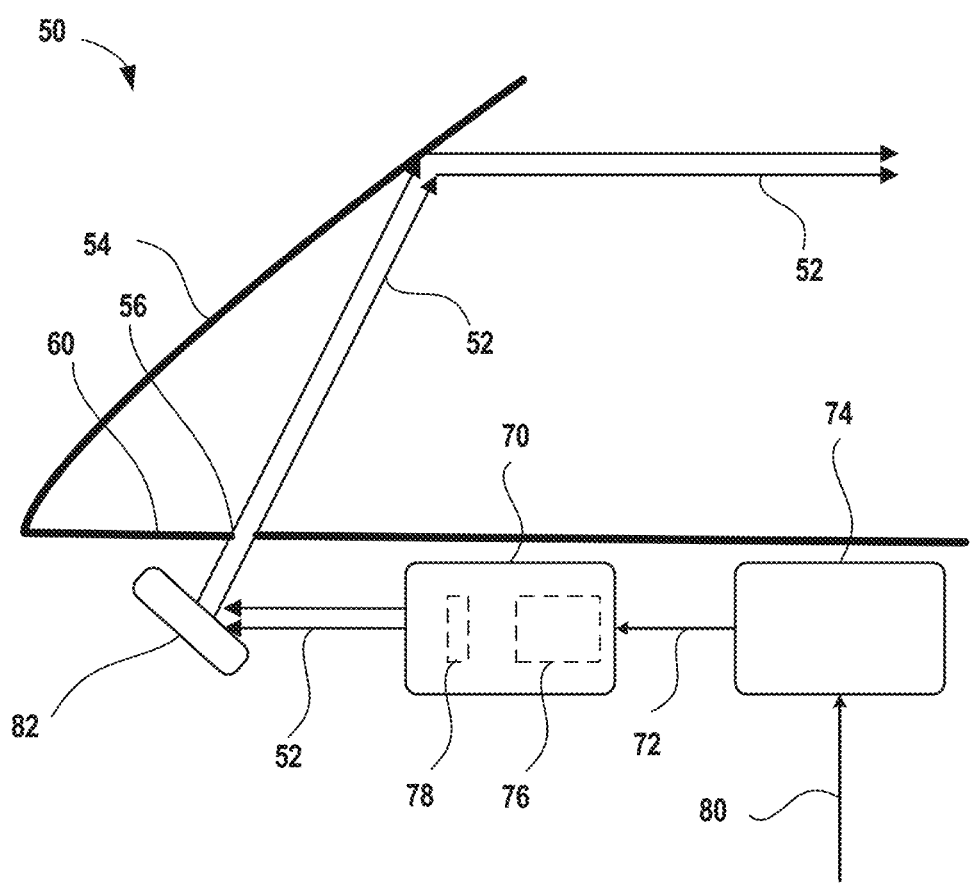
FIG. 1 shows one example of a head up display (HUD) system for a vehicle that can incorporate an optical display system in accordance with certain aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

In various aspects, the present disclosure pertains to an improved display system that minimizes speckle contrast where the system includes a coherent light source, such as a laser, and a liquid crystal component that includes a plurality of liquid crystals and a plurality of liquid crystal panels. As background, a magnitude of laser speckle can be represented by speckle contrast. The speckle contrast of a coherent light source, such as laser light, reflecting off a surface is considered to be a standard deviation of a measured intensity of light on that surface divided by an average intensity of light (e.g., a value obtained by dividing the standard deviation of the intensity distribution by the average of the intensity distribution). Thus, if a screen has the same brightness everywhere, the standard deviation from average would be zero, so there would be zero speckle. However due to the coherence and narrow spectrum of a laser light beam, interference patterns occur. Hence, a surface illuminated with laser light will appear to have dark regions and bright regions or laser speckle. These laser speckle patterns are formed in a viewer's retina and can change with the slightest movement, which can be quite bothersome to viewers, like drivers and passengers in a vehicle. Further, displays with a highly coherent laser light source (e.g., laser) can suffer from grainy images due to high speckle contrast.

However, in accordance with various aspects of the present disclosure, speckle contrast can be reduced by incorporating a liquid crystal display component that comprises both a plurality of liquid crystals and a plurality of nanoparticles. A "nanoparticle" as used herein may have at least one dimension that is less than or equal to about 450 nm. In certain variations, the nanoparticle has at least one dimension that is optionally less than or equal to about 400 nm, optionally less than or equal to about 350 nm, optionally less than or equal to about 300 nm, optionally less than or equal to about 250 nm, optionally less than or equal to about 200 nm, optionally less than or equal to about 150 nm, and in certain aspects, optionally less than or equal to about 100 nm.

In certain aspects, the plurality of nanoparticles included in the liquid crystal component may have an average particle size diameter of greater than or equal to about 1 nm to less than or equal to about 200 nm, optionally greater than or equal to about 1 nm to less than or equal to about 100 nm. As will be described further below, for certain types of liquid crystals, the nanoparticle may have an average diameter of greater than or equal to about 1 nm to less than or equal to about 20 nm and optionally greater than or equal to about 1 nm to less than or equal to about 10 nm.

The nanoparticles may have a variety of shapes including, by way of non-limiting example, substantially round shapes, like spheres and ellipsoids/ovals, rectangles, polygons, discoids/discs, ellipsoids, toroids, cones, pyramids, rods/cylinders, crosses, and the like. Nanoparticles having distinct shapes may be combined with one another, as well. In other aspects, the nanoparticle may have a substantially round shape, such as spheres, ellipsoids, hemispheres, and the like.

Due to the size of the nanoparticles, they are generally smaller than the wavelength of passing light. Thus, while the nanoparticles do not necessarily need to be transparent, in certain aspects, the nanoparticles are transparent and non-absorbing to the wavelength or band of wavelengths of the coherent light beam generated by the light source or laser. As used herein, "transparent" is intended to mean that a material or component is transmissive for a target range of wavelengths of electromagnetic energy, for example, in the visible, infrared, and/or ultraviolet wavelength ranges. Thus, in certain aspects, a transparent material or component transmits greater than or equal to about 70% of electromagnetic energy at the predetermined range of wavelengths, optionally of greater than or equal to about 75%, optionally greater than or equal to about 80%, optionally greater than or equal to about 85%, optionally greater than or equal to about 90%, optionally greater than or equal to about 95%, and in certain preferred aspects, optionally greater than or equal to about 98% of the electromagnetic energy at a predetermined wavelength or range of wavelengths (e.g., in the visible and/or infrared ranges of the spectrum) is transmitted through the material or component.

The predetermined wavelength or range of wavelengths of coherent light may be in the visible, ultraviolet (UV), and infrared (IR) ranges. Particularly suitable electromagnetic radiation includes, visible light having wavelengths ranging from about 390 to about 750 nm, infrared radiation (IR) (including near infrared (NIR) ranging from about 0.75 to about 1.4 µm), ultraviolet light (UV) having wavelengths of about 100 nm to about 390 nm. For example, visible light can have a wavelength in a range of about 625 nm to 740 nm for red, of about 590 nm to about 625 nm for orange, about 565 nm to about 590 nm for yellow, about 520 nm to about 565 nm for green, about 500 nm to about 520 nm for blue or cyan, about 435 nm to about 500 nm for blue or indigo; and about 380 nm to about 435 nm for violet.

The nanoparticles may be transparent for all wavelengths in the predetermined range depending on the application in which the display is used. For example, transparency for wavelengths in the visible range (or at least a portion of the visible range) is desirable for displays, transparency in IR wavelengths (or a portion of the IR range) is desirable for LIDAR, and transparency in UV wavelengths (or a portion of the UV range) is desirable for lithography.

Thus, the nanoparticles may be formed of a transparent material for the predetermined wavelength or range of wavelengths. Furthermore, the nanoparticles may be selected to have a refractive index (n, or the real part of refractive index) relative to a plurality of liquid crystals in the liquid crystal component. More specifically, a difference between a refractive index of the liquid crystals and a refractive index of the nanoparticles is greater than 0 to less than or equal to about 0.5, optionally greater than or equal to about 0.01 to less than or equal to about 0.5, optionally greater than or equal to about 0.02 to less than or equal to about 0.5. Generally, a higher difference in refractive indices between the liquid crystals and the nanoparticles is desirable to enhance the reduction in speckle contrast. In certain variations, the refractive index of the nanoparticle material greater than or equal to about 0.48 to less than or equal to about 2.

The nanoparticles may be formed of a material selected from the group consisting of: silicon oxide ($SiO_2$), zirconium dioxide ($ZrO_2$), titanium dioxide ($TiO_2$), other metal oxides, and combinations thereof. In certain aspects, where an alternating current is applied, the generation of electrostatic charge (also known as triboelectric charge) is minimized, so zeta potential is absent or near zero in the nanoparticles.

The plurality of liquid crystals may include nematic liquid crystals, either having a positive dielectric anisotropy (e.g., those nematic liquid crystals used for twisted nematic or in-plane-switching mode displays) or negative dielectric anisotropy (e.g., those nematic liquid crystals used in fringe-field-switching or vertically-aligned mode displays) or ferroelectric liquid crystals. In certain variations, the plurality of liquid crystals may include negative nematic liquid crystals having a negative dielectric anisotropy, or ferroelectric liquid crystals. Suitable negative nematic liquid crystals include HNG715600-100 Merck MLC 2079 liquid crystal. Suitable ferroelectric liquid crystals include Felix-M4851. The liquid crystals, such as ferroelectric liquid crystals, may be doped with a dopant. The dopant can be surfactant, chiral dopant, and/or polymers. An ordinary refractive index ($n_o$) may be less than or equal to about 1.5 for the liquid crystal material.

Figure 9:
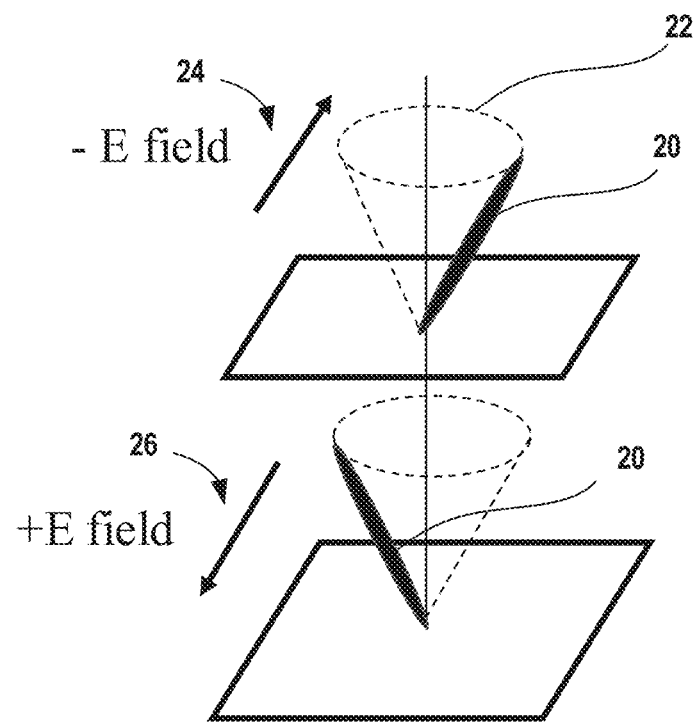
FIG. 9 shows a defined cone of movement that occurs for ferroelectric liquid crystal molecules when alternating current (AC) voltages are applied.

In accordance with various aspects of the present disclosure, nanoparticles, such as nanospheres, are mixed with liquid crystals and disposed in a compartment of a liquid crystal component or device. When an electric current or voltage is applied, it creates an electric field within the liquid crystal component comprising the nanoparticles and liquid crystals. The speckle contrast is reduced by temporal averaging induced by varying random domains in liquid crystal medium when voltage or current is applied. More specifically, in view of the particular combination of nanoparticles and liquid crystals described herein that have a significant difference in refractive indices; the applied electric field further generates a temporal averaging effect in the mixture of liquid crystals and nanoparticles. Stated in another way, applying electrical energy to the liquid crystal component induces a temporal averaging effect. This means that the electric field causes movement of liquid crystal molecules and nanoparticles to generate localized random domains within the liquid crystal compartment so as to exhibit changes in refractive index that when averaged over time serves to reduce laser speckle by scattering the light and changing the phase of light passing through the mixture of liquid crystals and nanoparticles. This can occur by distinct mechanisms for different liquid crystal materials; however, the net effect is movement of the liquid crystals so that temporal averaging occurs to reduce observed laser speckle. Generally, certain classes of liquid crystals can provide an ability to become scattering under low frequency electric fields via electro hydrodynamic instability that can promote reduction in laser speckle. Further, nanoparticles and liquid crystals that have a significant difference in refractive indices provides stronger forward scattering intensity.

Where the liquid crystals are a negative nematic liquid crystal, the applying electrical energy generates a top-down electrical field to induce instability and movement (e.g., Brownian motion) in the plurality of liquid crystals. This creates random localized domains in the plurality of liquid crystals. The temporal variant random domains provide a temporal averaging effect of the laser speckle and reduces speckle contrast. The forward scattering from nanoparticles distributed within the mixture with the negative nematic liquid crystals enhances the intensity of transmitted (or reflected) light. In the case of ferroelectric liquid crystal molecules, these swings occur within a defined cone when alternating current (AC) voltages are applied. Such a concept is shown in simplified version in FIG. 9, where a ferroelectric liquid crystal molecule 20 is in a first position within a cone 22 shown with an electric field 24 having a first direction (−E field). The ferroelectric liquid crystal molecule 20 swings to a second position within the cone 22 when an electric field 26 having a second direction (+E field). Such behavior is further described in Pandey et al., Anti-Ferroelectric Liquid Crystals: Smart Materials for Antiferroelectric Future Displays, Advanced Energy Materials, Ch. 10, pp. 389-432 (2014), the relevant portions of which are incorporated herein by reference. The speed of swing is on a microsecond scale. Temporal averaging of the speckle pattern from constructive-destructive interference reduces the speckle contrast. In this manner, when the plurality of liquid crystals comprises ferroelectric liquid crystals and alternating current (AC) is applied, the ferroelectric liquid crystals move by swinging on a microsecond scale to create a temporal averaging effect by constructive-destructive interference. The presence of the nanoparticles in the mixture with the ferroelectric liquid crystals reduces the driving voltage necessary from the electrical source and further enhances the forward scattering intensity of light.

Techniques to reduce laser speckle in liquid crystal components have previously focused on physically or mechanically moving liquid crystal particles via rotation or vibration. For example, one method for reducing speckle can include incorporating a diffuser that moves or vibrates into the path of the laser beam. Advantageously, the present disclosure provides optical devices that are free of any motorized or mechanized parts for rotating or vibrating, as will be discussed below. Further, the variations provided by the present disclosure provide a reduced speckle contrast that is induced by application of an electric field, in contrast to other techniques that might reduce speckle contrast (for example, in the absence of an applied electric field). Furthermore, while nanoparticles have been included in liquid crystal components in the past, it was not contemplated to create active temporal averaging from the external electric field. Rather, these liquid crystal cells were twisted nematic liquid crystal modules that relied on the multi-scattering effect of the nanoparticles alone. Moreover, even when the liquid crystal cells were activated by application of an electric field, an amount of laser speckle reduction achieved is believed to be above 0.4 to 0.6.

In various aspects, the present disclosure provides an optical device. The optical device may be a display device, or as noted above, may be part of a LIDAR system or a lithographic system, by way of non-limiting example. FIG. 1 shows an example of a display system, which may be used in a vehicle. More specifically, FIG. 1 includes a non-limiting example implementation of a front projection head up display (HUD) system 50 for a vehicle for purposes of illustration. The HUD 50 projects an image 52 (a virtual image) onto a portion of the windshield 54 from an opening 56 in a dashboard 60. The image 52 includes various vehicle information, such as a present speed of the vehicle, warnings, a present gear of a transmission of the vehicle, an engine speed, a directional heading of the vehicle, present infotainment system settings, and/or other vehicle information. The image 52 displays this information to the driver of the vehicle without the driver having to change head position or averting a direction of gaze (e.g., without having to look away from objects) in front of the vehicle.

An image source 70 generates (e.g., projects) the image 52 based on signals 72 from a HUD control module 74. By way of example only, the image source 70 may include a coherent light source that generates a coherent light beam having a wavelength in the visible range. Thus, the image source 70 may comprise one or more lasers 76. The laser(s) 76 may create red, green, and blue light, by way of example. Where present, a liquid crystal device (LCD) component 78 is also included in the image source 70. The HUD control module 74 generates signals 72 sent to the image source 70 based on vehicle data 80 received from the vehicle.

The HUD control module 74 may obtain the vehicle data 80, for example, from a communication bus of the vehicle. The vehicle data 80 may include, for example, present speed of the vehicle, warnings, a present gear of a transmission of the vehicle, an engine speed, a directional heading of the vehicle, present infotainment system settings, and/or other vehicle information.

An optional reflector 82 reflects the image 52 generated by the image source 70 onto the windshield 54 through the opening 56. A viewer can view the image 52 in the area where the image 52 is projected onto the windshield 54. In various implementations, the reflector 82 may be omitted, and the image source 70 may instead be configured to project the image 52 directly onto the windshield 54.

FIGS. 2A and 2B show a liquid crystal component 100 for use in a display system like the HUD shown in FIG. 1, by way of non-limiting example. The liquid crystal component 100 is configured to receive and in certain operational states, to transmit a coherent light beam 110 generated by a coherent light source or laser (like laser 76 in FIG. 1).

The liquid crystal component 100 may include a first alignment layer 130 and a second alignment layer 140. The liquid crystal component 100 further includes a first electrode 132 and a second electrode 142. The first electrode 132 may be transparent to the coherent light beam 110. As will be described further below, in certain variations, the second electrode 142 may be either transparent or reflective to the coherent light beam 110. The electrically conductive elements (first and second electrodes 132, 142) are disposed adjacent to a respective first or second alignment layer 130, 140 (each having a surface morphology that induces a predetermined orientation of liquid crystals upon application of current thereto). The first and second alignment layers 130, 140 can have complementary surface morphologies that in certain variations can induce a preferred orientation—planar, homeotropic, or combinations of both—for the liquid crystals (described below) when voltage or current is applied to permit light to transmit and rotate through the liquid crystals. As appreciated by those of skill in the art, the first alignment layer 130 and the second alignment layer 140 are optional components and further in certain variations, while not shown, may be combined with the first electrode 132 and the second electrode 142 when a surface of each respective electrode facing the liquid crystals is patterned. The first electrode 132 and the second electrode 142 can be independently formed of an electrically conductive layer. By way of example, where the first electrode 132 and the second electrode 142 are transparent, the electrically conductive material may be independently selected from the group consisting of: indium tin oxide (ITO), metallic nanowires, metallic particles, gallium zinc oxide, aluminum gallium zinc oxide, poly(3,4-ethylenedioxythiophene) (PEDOT), and combinations thereof. Where the second electrode 142 is reflective, it may be formed of reflective electrically conductive metals, such as aluminum or aluminum alloys, by way of non-limiting example. Thus, the first electrode 132 and the second electrode 142 may be formed of distinct materials.

While not shown in FIGS. 2A-2B, in alternative variations, the transparent conductive layer can be patterned. It should be noted that no alignment layers or patterning may be required for operation of certain liquid crystals. Further, a plurality of layers can be included, including a plurality of patterned electrodes, by way of example.

The first electrode 132 is disposed on a first transparent substrate 134. The first electrode 132 and the first substrate 134 are configured to transmit at least a portion of the coherent light beam 110. The second electrode 142 is disposed on a second transparent substrate 144. In variations where the display system is a rear projection system, the second electrode 142 and the second substrate 144 are configured to transmit at least a portion of the coherent light beam 110. In other variations, where the display system is a front projection system, the second electrode 142 and/or the second substrate 144 are configured to reflect at least a portion of the coherent light beam 110. The liquid crystal component 100 thus can perform as a projection screen. For a rear projection display system, where the projector and viewer are on different side of the screen (e.g., liquid crystal component 100), the second electrode 142 and second substrate 144 need to be able to transmit light. For front projection display system, where the projector and viewer are on same side of the screen (e.g., liquid crystal component 100), the second electrode 142 and/or second substrate 144 can be reflective. Thus, the display system, such as a head up display can be made by the liquid crystal on silicon (LCoS) technology, in which a liquid crystal display (liquid crystal component 100) is directly fabricated on a silicon substrate backplane and a reflector is disposed beneath the silicon substrate.

In certain variations, the first substrate 134 and/or the second substrate 144 can be formed of a material that is transparent to the coherent light beam 110, for example, may be formed of a glass (e.g., silica or a borosilicate) or a polymer. The first electrode 132 is disposed on a first transparent substrate 134. In certain variations, the first electrode 132 may be coated on the first substrate 134 and the first alignment layer 130 may be coated onto the first electrode 132. Likewise, the second electrode 142 may be coated on the second substrate 144 and the second alignment layer 140 may be coated onto the second electrode 142.

The liquid crystal component 100 also includes spacers 150 that are disposed between the first alignment layer 130 and first electrode 132 and the second alignment layer 140 and second electrode 142. The spacers 150 thus define a perimeter 152 of an interior compartment 160 of the liquid crystal component 100. The interior compartment 160 can thus be a sealed compartment. In certain aspects, a thickness of the interior component (designated 120) may be greater than or equal to about 1 micrometers ($\mu$m) to less than or equal to about 100 optionally greater than or equal to about 3 micrometers ($\mu$m) to less than or equal to about 50 optionally greater than or equal to about 10 micrometers ($\mu$m) to less than or equal to about 50 and in certain variations, optionally greater than or equal to about 10 micrometers ($\mu$m) to less than or equal to about 20 $\mu$m.

A plurality of liquid crystals 162 are disposed in the interior compartment 160. The liquid crystals 162 can be a variety of different liquid crystals, as are known in the art, including positive dielectric anisotropy (where an alignment layer or patterned electrode is required) or negative anisotropy (where a patterned electrode is not required).

Further, in accordance with various aspects of the present disclosure, a plurality of nanoparticles 170 are also disposed in the interior compartment 160, such as those described above previously. As noted above, the nanoparticles 170 desirably have a maximum dimension of less than or equal to about 450 nm. The nanoparticles 170 are transparent to the coherent light 110.

A medium or mixture may comprise greater than 0 weight % to less than or equal to about 20 weight % of the plurality of nanoparticles 170 and greater than or equal to about 80 weight % to less than 100 weight % of the plurality of liquid crystals 162, optionally greater than 0 weight % to less than or equal to about 10 weight % of the plurality of nanoparticles 170 and greater than or equal to about 90 weight % to less than 100 weight % of the plurality of liquid crystals 162, and optionally greater than 5 weight % to less than or equal to about 10 weight % of the plurality of nanoparticles 170 and greater than or equal to about 90 weight % to less than 95 weight % of the plurality of liquid crystals 162. In one variation, the medium comprises about 6 weight % of the plurality of nanoparticles 170 and about 94 weight % of the plurality of liquid crystals 162 (e.g., ferroelectric liquid crystals). In certain other variations, the interior compartment 160 includes a medium comprising not only liquid crystals 162 and nanoparticles 170, but may also include at least one additional component, such as polymers (up to about 30 weight %), surfactants (up to about 1 weight %) that serve to improve the electro-optical response of the materials in the interior compartment 160 of the liquid crystal component 100. The amounts of nanoparticles and liquid crystals set forth above would be adjusted accordingly when such additional components are present. In certain variations, an example of a polymer for incorporation into the interior compartment may include an optical adhesive, such as Norland™ Optical Adhesives, reactive monomers and the like. Suitable surfactants include sodium dodecyl sulfonate, sodium dodecyl benzenesulfonate, polyethoxylated octyl phenol, dimethyl ether of tetradecyl phosphonic acid, tetrabutyl ammonium bromide, poly(alcohols), ethleneoxide/propyleneoxide copolymers, and the like, by way of non-limiting example.

While not shown, additional known components may be associated with the liquid crystal component 100, such as one or more diffusers, polarizers, filters, and the like.

The liquid crystal component 100 is in electrical communication with an electrical source 180. The first electrode 132 may be electrically connected to the electrical source 180 via a first conduit 182. The second electrode 142 may be electrically connected to the electrical source 180 via a second conduit 184. At least one switch 186 is provided in the circuit, which as shown is connected to the second conduit 184, by way of example. As appreciated by those of skill in the art, while not shown, additional electrical contacts and contact bridges may be provided in the liquid crystal component 100.

As shown in FIG. 2A, in a first operational state, the switch 186 is in an open or non-activated position, so that there is no circuit and no voltage or current flows through the second conduit 184. As shown in FIG. 2A, the electric field is off and coherent light 110 exits the liquid crystal component 100 as a first output 190. The first output 190 is a coherent light beam that is transmitted through the interior compartment 160 of the liquid crystal component 100 and exhibits speckle contrast, for example, above about 0.25±0.02, and in certain aspects, optionally above 0.3±0.02, which may be considered to be above 0.28, as will be described further below.

In a second operational state shown in FIG. 2B, the switch 186 is in a closed or activated position, such that a circuit is formed and electrical energy (e.g., AC voltage) flows through the first conduit 182 and the second conduit 184. In FIG. 2B, the electric field is on. By applying an electric field to the liquid crystals 162 in the interior compartment 160, the liquid crystals are destabilized to induce random domains and a temporal averaging effect is created within the interior compartment 160 that advantageously reduces laser speckle. For example, when an AC voltage is applied on the transparent conductive layers on first and second substrate, the applied voltage induces instability in negative nematic liquid crystal (N-NLC) or swing in ferroelectric liquid crystals (FLC). The temporal variance of the random domains of N-NLC or the microsecond swing of FLC provides a temporal averaging.

A second output 192 generated during the second operational state is non-coherent and advantageously reduces speckle contrast. For example, for a theoretical laser without any liquid crystal component prepared in accordance with certain aspects of the present disclosure, an unpolarized laser spot may have a speckle contrast of about $1/\text{sqrt}^2$=about 0.7. When the coherent light from the laser passes through a liquid crystal component prepared in accordance with certain aspects of the present disclosure in a second operational state, a speckle contrast is less than or equal to about 0.2, optionally less than or equal to about 0.15, optionally less than or equal to about 0.1, optionally less than or equal to about 0.05, optionally less than or equal to about 0.04, and in certain variations, optionally less than or equal to about 0.03. A speckle contrast of about 0.04 is more than 90% of speckle reduction as compared to the untreated laser.

In certain aspects, a frequency of electrical energy applied by the electrical source 180 can have a frequency of greater than 0 Hz to less than or equal to about 1 kHz, optionally greater than or equal to about 1 Hz to less than or equal to about 500 Hz, and in certain variations, greater than or equal to about 1 Hz to less than or equal to about 250 Hz. The presence of the nanoparticles 170 described above in the liquid crystal interior compartment 160 provides certain advantages, such as reducing the driving voltage and enhancing the forward scattering intensity. In certain aspects, an increase in forward scattering intensity is greater than or equal to about 20% of a coherent light beam for a liquid crystal component comprising the nanoparticles as compared to a comparative forward scattering intensity for a coherent light beam in a liquid crystal component where the nanoparticles are absent.

In certain aspects, a voltage applied by the electrical source 180 can be greater than or equal to about 1V to less than or equal to about 1 kV, optionally greater than or equal to about 10 V to less than or equal to about 100 V, and in certain variations, greater than or equal to about 10 V to less than or equal to about 60V. Applied electric fields with these characteristics induce instability of liquid crystals 162 and hence randomly move the nanoparticles 170 (e.g., nanospheres). As such, the speckle contrast is thus reduced due to an averaging effect from the moving nanospheres. The amount of speckle contrast reduction can be controlled by the driving voltage conditions, where a higher voltage tends to provide greater movement of the nanoparticles 170 (e.g., nanospheres) and a greater reduction in speckle contrast.

Figure 3:
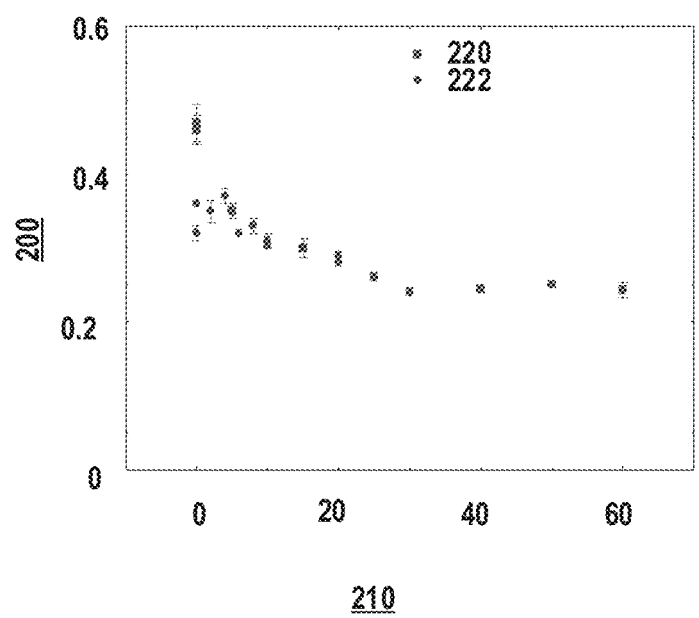
FIG. 3 is a chart showing speckle contrast versus voltage for a coherent laser light beam directed at a variation of a liquid crystal display component prepared in accordance with certain aspects of the present disclosure.

FIG. 3 is a chart showing speckle contrast in a liquid crystal component prepared in accordance with certain aspects the present disclosure. The liquid crystals are ferroelectric liquid crystals (a mixture of different types of molecules), such as Felix M4851, available from Clariant, Germany, and the nanoparticles comprise silica and are either Aerosil® 812 or Aerosil® R972 commercially available from Evonik Industries AG. More specifically, the speckle contrast (represented by y-axis 200) versus voltage (represented by x-axis 210 in Volts) of a coherent light (e.g., laser) source having a wavelength of 488 nm is shown. A first liquid crystal component has the ferroelectric liquid crystals and 6% by weight of either Aerosil® 812 nanoparticles (designated as 220) or Aerosil® R972 nanoparticles (designated 220). Results are shown when 60 Hz of electrical energy is applied from greater than 0 up to 60 Volts in Table 1.

TABLE 1

| | Nanoparticle - Aerosil 812 | Nanoparticle - Aerosil R972 |
| --- | --- | --- |
| Mean Particle size | 7 nm | 16 nm |
| Speckle contrast reduction | 39% | 20% |

To measure speckle, a laser beam is expanded so that a 3 mm spot hits the liquid crystal device. A picture is taken of the spot at the device at an angle (a 22.5 degrees angle is used, but any angle can be measured). The light source and the camera are on opposite sides of the liquid crystal device. Pictures can also be taken of the laser spot on a screen, which can be placed anywhere down the beam path.

The pictures are stored as bitmap images. The images are 3,000×4,000 pixels and each pixel has three numbers (channels) that can range from 0-255. There is one channel each for red, blue, and green colors. This image is converted black and white resulting in one channel that reveals the luminance of each pixel. The luminance is a scaled factor of intensity, so it is an appropriate value to use.

At this point, luminance values are averaged for a black and white picture. In view of the large number of data points, the information is extracted from the diameter of the laser spot, which provides greater than 1,000 data points. The outer edges of the spot are disregarded, because the luminance decreases closer to the edge(s). Many known software products can give the average and standard deviation of a set of data points. Easy Plot™ and Matlab™ software programs are used to conduct the analysis described herein. Once those are determined, the contrast measurement is done.

As the wavelengths are in the visible light range, a camera is set up to simulate the conditions of the eye. The camera is set to manual. A ⅟30 second exposure is used, as this is close to the human condition. The aperture is set to 6 to represent the human pupil. ISO is set to 80. Magnification is set to achieve a spot diameter of 1,500 pixels. The room is dark as possible. The speckle contrast values are then measured and calculated.

Figure 4:
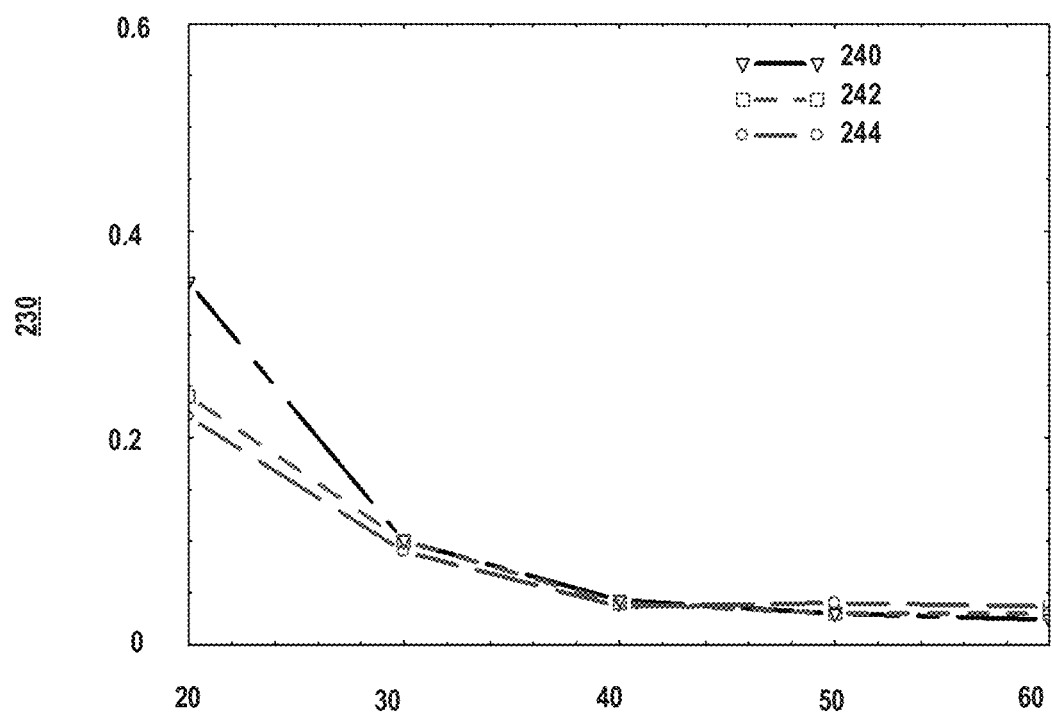
FIG. 4 is a chart showing speckle contrast versus voltage for a coherent laser light beam directed at another variation of a liquid crystal display component prepared in accordance with certain aspects of the present disclosure.

FIG. 4 is a chart showing speckle contrast in a liquid crystal component prepared in accordance with certain other aspects the present disclosure. The liquid crystals are negative nematic HNG715600 10 μm planar square liquid crystals) and the nanoparticles comprise $ZrO_2$ having an average particles size of 100 nm commercially available from Sigma Aldrich and present at about 7.3% by weight. More specifically, the speckle contrast (represented by y-axis 230) versus voltage (represented by x-axis 232 in Volts) of a coherent light (e.g., laser) source having a wavelength of 488 nm laser light at a wavelength of _____ nm is shown. Results are shown when 90 Hz (designated 240), 60 Hz (designated 242), and 30 Hz (designated 30 Hz) of electrical energy is applied from greater than 20 up to 60 Volts. The lowest speckle contrast achieve with this approach is approximately 0.04.

Figure 5A:
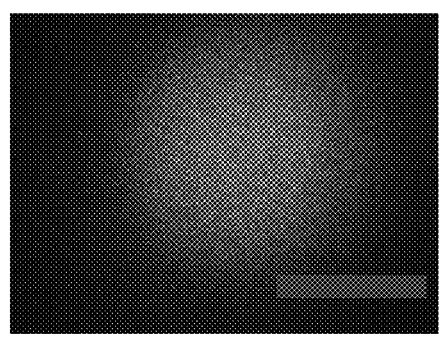
FIGS. 5A-5B show laser lights in a visible range passing through a liquid crystal component prepared in accordance with a certain variation of the present disclosure in a first operational state with no electrical energy applied (0V) and a second operational state with electrical energy applied (60V).
Figure 5B:
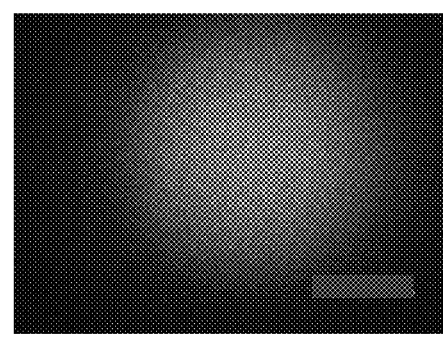

FIGS. 5A-5B show laser light in a visible range passing through a ferroelectric liquid crystal component prepared in accordance with a certain variation of the present disclosure. The liquid crystals used are Felix M4851, a doped ferroelectric liquid crystal. The nanoparticles are silica Aerosil® 812 having an average particle diameter of about 7 nm provided at about 5.8 wt. % to LC. FIGS. 5A-5B show a laser with a wavelength of about 488 nm corresponding to blue light. FIG. 5A shows the laser light passing through the liquid crystal component in a first operational state, where no electric field is applied. As can been seen, there is speckle or grainy dark spots that appear. FIG. 5B shows the laser light passing through the liquid crystal component in a second operational state, where an electric field of 14V 120 Hz square wave pulse is applied. As can been seen, the speckle contrast is reduced and there is a substantial reduction in speckle. About 39% speckle reduction using pulsed waveform and doped ferroelectric Table 2 shows additional results from this testing.

TABLE 2

| | Mean Intensity | σ (standard deviation) | Speckle Contrast |
| --- | --- | --- | --- |
| Burst (second operational state) | 118 | 20.5 | 0.174 |
| Off State (second operational state) | 97.3 | 27.6 | 0.284 |

The liquid crystal components prepared in accordance with certain aspects of the present disclosure can be incorporated into different display system configurations. Thus, a liquid crystal component is provided that reduces speckles of projection displays that employ coherent light sources. The liquid crystal component or device may be used in a variety of different display configurations, including before imaging occurs to provide speckle reduction from a coherent light source; after imaging occurs, where the liquid crystal component serves as a projection screen, or after imaging occurs, but where the liquid crystal component serves as a filter before a projection screen on which the image is created.

Figure 6:
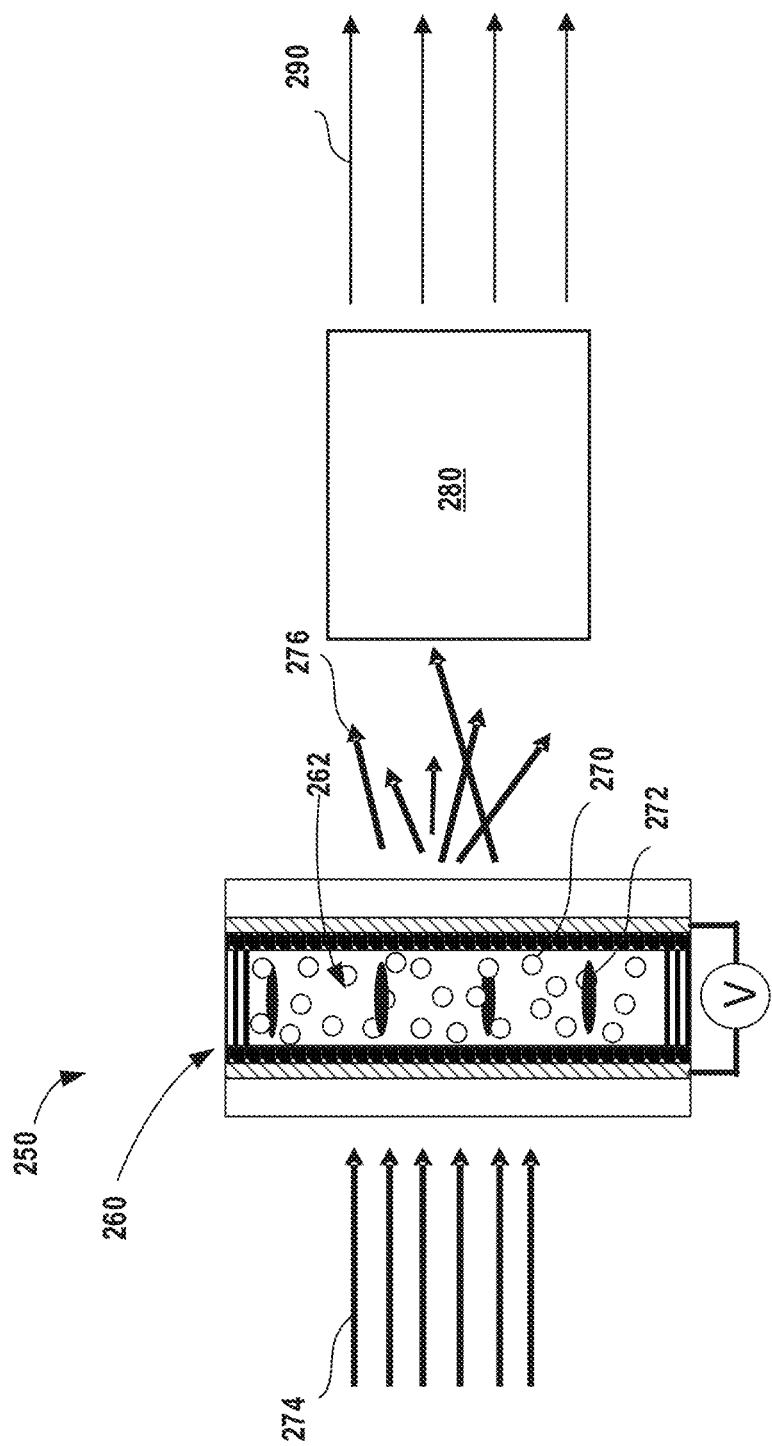
FIG. 6 shows one display device configuration having a liquid crystal display component disposed prior to an imaging device prepared in accordance with certain aspects of the present disclosure.

In one example shown in FIG. 6, a display system 250 includes a liquid crystal component 260 like that described in the context of FIGS. 2A-2B. For brevity, unless specifically discussed, the various components are not described again but can be understood to be present and function in the same manner as described in the context of FIGS. 2A-2B. Briefly, an interior compartment 262 includes a plurality of liquid crystals 270 and a plurality of nanoparticles 272. The liquid crystal component 260 is shown in a second operational state, where an electric field is applied to the interior compartment 262.

While the liquid crystal component 260 may be considered to be a part of an imaging system that generates a display image from the coherent light beam, in FIG. 6, the liquid crystal component 260 is disposed before imaging components, so that speckle reduction from the light source is achieved. As shown, a coherent laser light 274 is directed towards the liquid crystal component 260 from a light source (not shown). After passing through the liquid crystal component 260, a non-coherent light 276 is generated. The non-coherent light 276 passes into additional display component(s) 280, which may include collimation and imaging optic devices. After passing through the additional display component(s) 280, an image 290 is generated.

Figure 7:
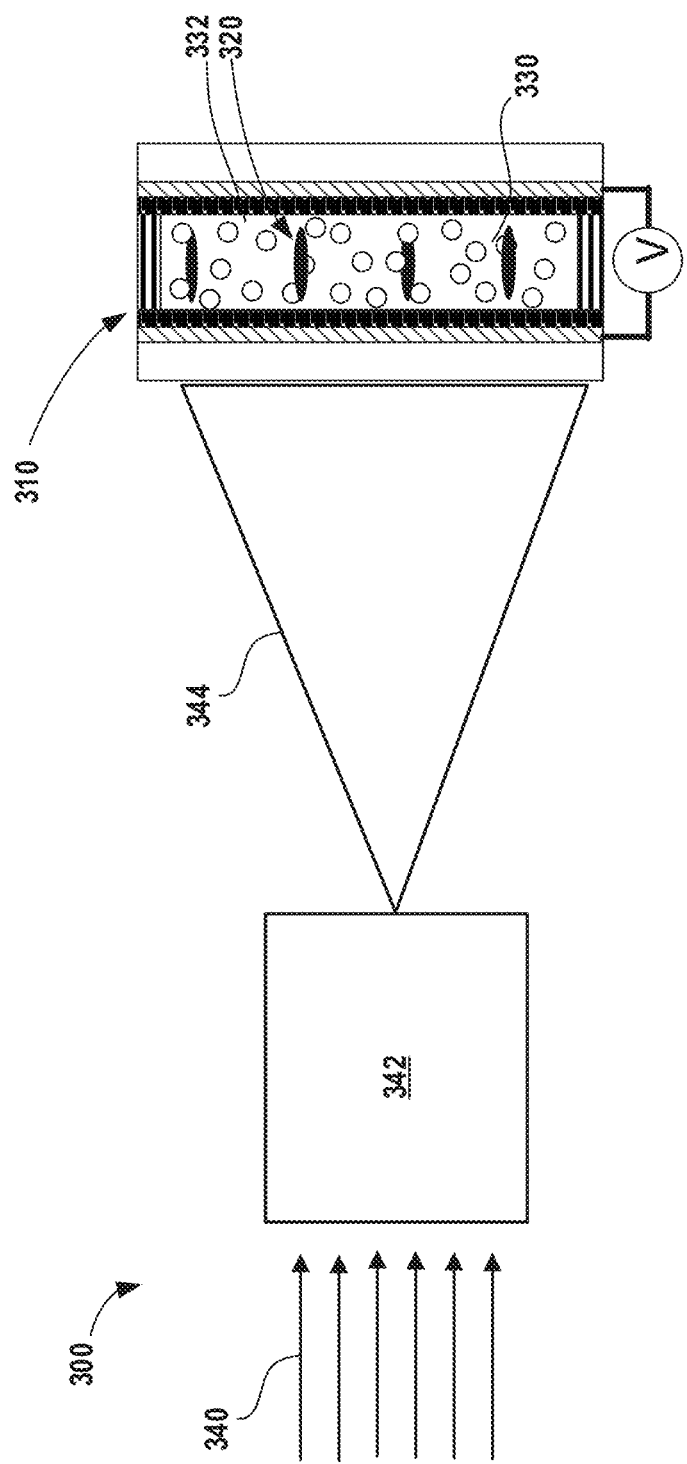
FIG. 7 shows another display device configuration having a liquid crystal display component disposed after an imaging device, where the liquid crystal component serves as a projection screen prepared in accordance with certain aspects of the present disclosure.

FIG. 7 shows a display system 300, where a liquid crystal component 310 like that described in the context of FIGS. 2A-2B is disposed in an imaging system after an image is created (e.g., the liquid crystal component 310 serves as a projection screen). For brevity, unless specifically discussed, the various components are not described again but can be understood to be present and function in the same manner as described in the context of FIGS. 2A-2B. Briefly, an interior compartment 320 includes a plurality of liquid crystals 330 and a plurality of nanoparticles 332. The liquid crystal component 310 is shown in a second operational state, where an electric field is applied to the interior compartment 320.

In FIG. 7, liquid crystal component 310 is disposed after imaging components, so that speckle reduction in the image generated by coherent light occurs. As shown, a coherent laser light 340 is directed towards an imaging device 342. The imaging device 342 generates a display image 344 that is projected onto the liquid crystal component 310. The imaging device 342 may comprise typical components, including those described above. Speckle in the image 344 is reduced as it is projected onto the liquid crystal component 310.

Figure 8:
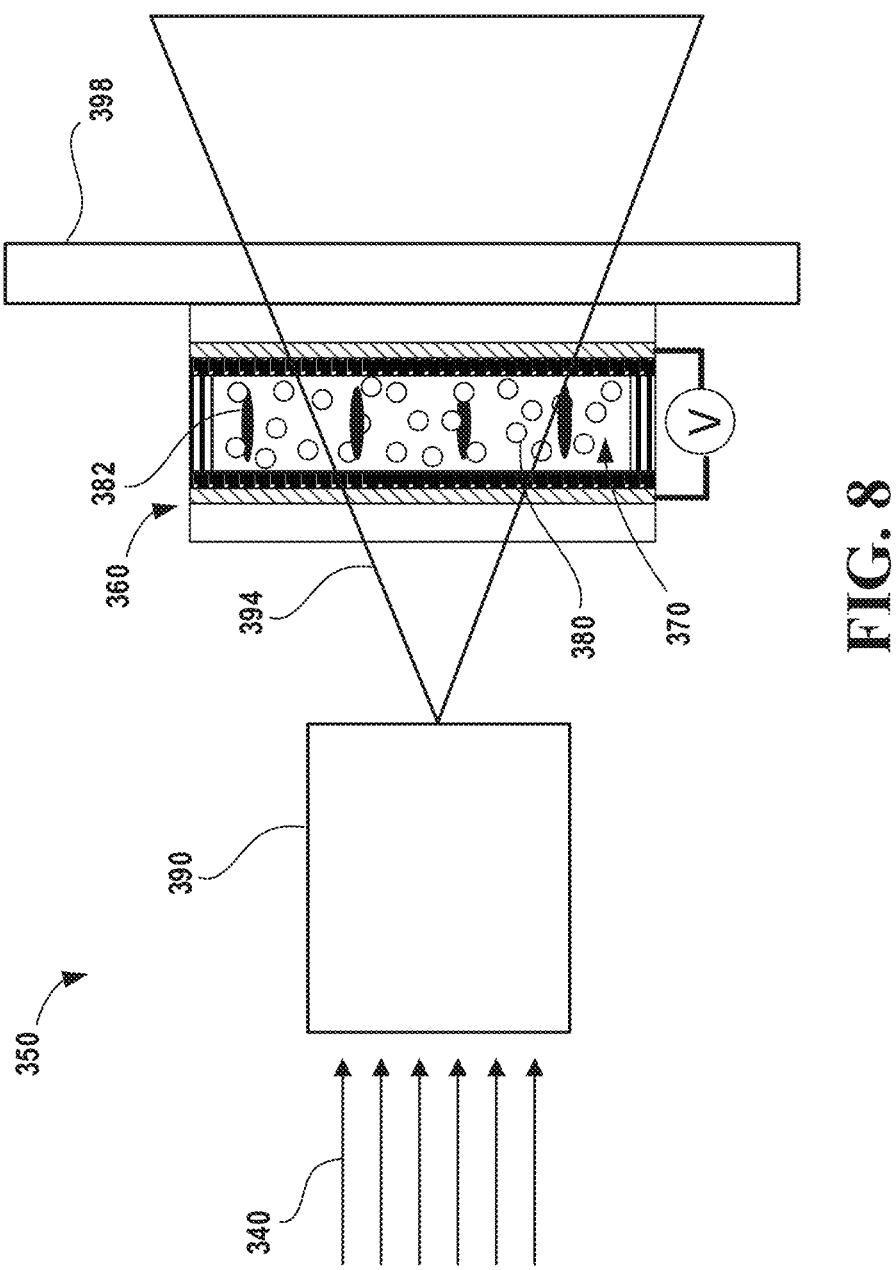
FIG. 8 shows yet another display device configuration prepared in accordance with certain aspects of the present disclosure having a liquid crystal display component disposed after an imaging device and a projection screen, where the liquid crystal component reduces speckle of a displayed image on a projection screen.

Yet another variation of a display system 350 is shown in FIG. 8, where a liquid crystal component 360 like that described in the context of FIGS. 2A-2B is disposed after an image is created, but before a projection screen. Again, for brevity, unless specifically discussed, the various components are not described again but can be understood to be present and function in the same manner as described in the context of FIGS. 2A-2B. Briefly, an interior compartment 370 includes a plurality of liquid crystals 380 and a plurality of nanoparticles 382. The liquid crystal component 360 is shown in a second operational state, where an electric field is applied to the interior compartment 370.

In FIG. 8, liquid crystal component 360 is disposed after an imaging device 390 including various imaging components, so that speckle reduction in the displayed image generated by coherent light occurs. As shown, a coherent laser light 392 is directed towards the imaging device 390. The imaging device 390 generates an image 394 that transmits through the liquid crystal component 360. A projection screen 398 is disposed after the liquid crystal component 360. Speckle in the image 394 is reduced as it passes through the liquid crystal component 310 and is projected onto the projection screen 398. It should be noted that the variations shown in FIGS. 5-7 are merely representative of configurations that can be used in display applications and are non-limiting. Furthermore, such systems may include a variety of components that are known in the display and optics fields, but are not shown.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An optical device comprising:
    a coherent light source that generates a coherent light beam having a wavelength in a visible range, an ultraviolet range, or an infrared range; and
    a liquid crystal component, wherein the coherent light beam is directed at the liquid crystal component and the liquid crystal component comprises:
        a first electrode configured to transmit the coherent light beam;
        a second electrode configured to transmit or reflect the coherent light beam;
        at least one spacer disposed between the first electrode and the second electrode to define an interior compartment therebetween;
        a plurality of ferroelectric liquid crystals disposed in the interior compartment having a first refractive index;
        a plurality of nanoparticles having a second refractive index and an average diameter of less than or equal to about 450 nm disposed in the interior compartment, wherein a difference between the first refractive index and the second refractive index is greater than 0 to less than or equal to about 0.5 and wherein the interior compartment comprises greater than 5 weight % to less than or equal to about 10 weight % of the plurality of nanoparticles;
        a polymer disposed in the interior compartment, wherein the interior compartment comprises greater than 0 weight % to less than or equal to about 30 weight % of the polymer;
        a surfactant disposed in the interior compartment, wherein the interior compartment comprises greater than 0 weight % to less than or equal to about 1 weight % of the surfactant; and
        an electrical source in electrical communication with the first electrode and the second electrode, wherein in a first state having no applied voltage or current, a filtered light beam that is transmitted or reflected from the liquid crystal component exhibits a first speckle contrast greater than or equal to about 0.28 and in a second state when a voltage or current is applied to the first and second electrodes from the electrical source, the plurality of nanoparticles to generate a temporal averaging effect and the filtered light beam has a second speckle contrast that is less than or equal to about 0.2.

2. The optical device of claim 1, wherein the average diameter of the plurality of nanoparticles is greater than or equal to about 1 nm to less than or equal to about 100 nm and the plurality of nanoparticles has a shape selected from the group consisting of: spheres, ellipsoids, rectangles, polygons, discoids, ellipsoids, toroids, cones, pyramids, rods, cylinders, crosses, and combinations thereof.

3. The optical device of claim 1, wherein the average diameter of the plurality of nanoparticles is greater than or equal to about 1 nm to less than or equal to about 10 nm.

4. The optical device of claim 1, wherein the plurality of nanoparticles comprises a material selected from the group consisting of: silicon oxide ($SiO_2$), zirconium dioxide ($ZrO_2$), titanium dioxide ($TiO_2$), and combinations thereof.

5. The optical device of claim 1, wherein the plurality of nanoparticles comprises a material having a refractive index of greater than or equal to about 0.48 to less than or equal to about 2.

6. The optical device of claim 1, wherein the second speckle contrast is less than or equal to about 0.1 at an applied voltage of greater than or equal to about 30V.

7. The optical device of claim 1 wherein the electrical source is configured to apply a frequency of electrical energy of greater than 0 Hz to less than or equal to about 1 kHz and having a voltage of greater than or equal to about 1V to less than or equal to about 1 kV.

8. The optical device of claim 1, wherein the first electrode and the second electrode are respectively disposed on transparent substrates and the first electrode and the second electrode independently comprise an electrically conductive material selected from the group consisting of: indium tin oxide, metallic nanowires, metallic particles, gallium zinc oxide, aluminum gallium zinc oxide, poly(3,4-ethylenedioxythiophene) (PEDOT), and combinations thereof.

9. The optical device of claim 1, wherein the ferroelectric liquid crystals are doped with a dopant.

10. The optical device of claim 9, wherein the dopant is one of a surfactant and chiral dopant.

11. A display device comprising:
   a coherent light source that generates a coherent light beam having a wavelength in a visible range; and
   an imaging system that generates a display image from the coherent light beam, wherein the imaging system comprises a liquid crystal component comprising:
      a first electrode configured to transmit the coherent light beam;
      a second electrode configured to transmit or reflect the coherent light beam;
      at least one spacer disposed between the first electrode and the second electrode to define an interior compartment therebetween;
      a plurality of ferroelectric liquid crystals disposed in the interior compartment having a first refractive index;
      a plurality of nanoparticles having a second refractive index and an average diameter of less than or equal to about 450 nm disposed in the interior compartment, wherein a difference between the first refractive index and the second refractive index is greater than 0 to less than or equal to about 0.5 and wherein the interior compartment comprises greater than 5 weight % to less than or equal to about 10 weight % of the plurality of nanoparticles;
      a polymer disposed in the interior compartment, wherein the interior compartment comprises greater than 0 weight % to less than or equal to about 30 weight % of the polymer;
      a surfactant disposed in the interior compartment, wherein the interior compartment comprises greater than 0 weight % to less than or equal to about 1 weight % of the surfactant; and
      an electrical source in electrical communication with the first electrode and the second electrode, wherein in a first state having no applied voltage or current, a filtered light beam that is transmitted or reflected from the liquid crystal component exhibits a first speckle contrast greater than or equal to about 0.28 and in a second state when a voltage or current is applied to the first and second electrodes from the electrical source, the plurality of nanoparticles generate a temporal averaging effect and the filtered light beam has a second speckle contrast that is less than or equal to about 0.2.

12. The display device of claim 11, wherein the imaging system comprises an imaging device and the liquid crystal component is disposed in the imaging system:
   (i) before the display image is generated by an imaging device;
   (ii) after the display image is generated by an imaging device, wherein the liquid crystal component is a projection screen for the display image; or
   (iii) after the display image is generated by an imaging device, wherein the imaging system further comprises a projection screen and the liquid crystal component is disposed between imaging device and the projection screen.

13. The display device of claim 11, wherein the electrical source is configured to apply a frequency of electrical energy of greater than 0 Hz to less than or equal to about 1 kHz and having a voltage of greater than or equal to about 1V to less than or equal to about 1 kV,
   the plurality of nanoparticles comprises a material selected from the group consisting of: silicon oxide ($SiO_2$), zirconium dioxide ($ZrO_2$), titanium dioxide ($TiO_2$), and combinations thereof, and:
   the average diameter of the plurality of nanoparticles is greater than or equal to about 1 nm to less than or equal to about 10 nm.

14. A method of reducing speckle in an optical device having a coherent light source, the method comprising:
   directing a coherent light beam generated by the coherent light source having a wavelength in a visible range, an ultraviolet range, or an infrared range towards a liquid crystal component comprising:
      a first electrode configured to transmit the coherent light beam;
      a second electrode configured to transmit or reflect the coherent light beam;
      at least one spacer disposed between the first electrode and the second electrode to define an interior compartment therebetween;
      a plurality of ferroelectric liquid crystals disposed in the interior compartment having a first refractive index;
      a plurality of nanoparticles having a second refractive index and an average diameter of less than or equal to about 450 nm disposed in the interior compartment, wherein a difference between the first refractive index and the second refractive index is greater than 0 to less than or equal to about 0.5, and wherein the interior compartment comprises greater than 5 weight % to less than or equal to about 10 weight % of the plurality of nanoparticles;
      a polymer disposed in the interior compartment, wherein the interior compartment comprises greater than 0 weight % to less than or equal to about 30 weight % of the polymer;
      a surfactant disposed in the interior compartment, wherein the interior compartment comprises greater than 0 weight % to less than or equal to about 1 weight % of the surfactant; and
      an electrical source in electrical communication with the first electrode and the second electrode; and
   applying electrical energy via the electrical source to the first electrode and the second electrode of the liquid crystal component to induce random domains in the plurality of liquid crystals and reduce a speckle contrast of the coherent light beam transmitted or reflected from the liquid crystal component to less than or equal to about 0.2.

15. The method of claim 14, wherein the electrical energy has a frequency greater than 0 Hz to less than or equal to about 1 kHz and a voltage of greater than or equal to about 1V to less than or equal to about 1 kV.

16. The method of claim 14, wherein the speckle contrast is less than or equal to about 0.1 when the electrical energy is applied at a voltage of greater than or equal to about 30V.

17. The method of claim 14, wherein the applying electrical energy comprises applying an alternating current (AC), so that the ferroelectric liquid crystals swing on a microsecond scale to create a temporal averaging effect by constructive-destructive interference.

18. The method of claim 14, wherein the plurality of nanoparticles comprises a material selected from the group consisting of: silicon oxide ($SiO_2$), zirconium dioxide ($ZrO_2$), titanium dioxide ($TiO_2$), and combinations thereof, and the average diameter of the plurality of nanoparticles is greater than or equal to about 1 nm to less than or equal to about 10 nm.

\* \* \* \* \*